United States Patent [19]

Duikers et al.

[11] 3,800,638
[45] Apr. 2, 1974

[54] APPARATUS FOR DEFLASHING HOLLOW BODIES OF PLASTIC MATERIAL

[75] Inventors: Marcel Duikers, La Hulpe; Maurice Minsart, Namur, both of Belgium

[73] Assignee: Solvay & Cie, Brussels, Belgium

[22] Filed: Nov. 10, 1971

[21] Appl. No.: 197,419

[30] Foreign Application Priority Data
Nov. 10, 1970 France .............................. 70.40532
Feb. 18, 1971 France .............................. 71.05655

[52] U.S. Cl. .............................................. 82/101
[51] Int. Cl. ............................................. B23b 3/04
[58] Field of Search ............ 82/46, 59, 60, 70, 70.1, 82/70.2, 83, 84, 85, 90, 101

[56] References Cited
UNITED STATES PATENTS

| | | | |
|---|---|---|---|
| 2,298,366 | 10/1942 | Gladfelter | 82/101 |
| 2,114,272 | 4/1938 | Temple | 82/85 |
| 3,084,578 | 4/1963 | Hartford | 82/60 |
| 3,400,620 | 9/1968 | Armbruster | 82/101 |
| 3,481,233 | 12/1969 | Yann | 82/101 |
| 3,302,500 | 2/1967 | Hackenberger | 82/101 |
| 1,934,660 | 11/1933 | Fairchild | 82/101 |
| 3,662,633 | 5/1972 | Bourgeois | 82/101 |
| 3,653,285 | 4/1972 | Yoshikawa | 82/101 |

FOREIGN PATENTS OR APPLICATIONS

| | | | |
|---|---|---|---|
| 1,131,703 | 10/1968 | Great Britain | 82/85 |
| 148,212 | 12/1962 | U.S.S.R. | 82/101 |

*Primary Examiner*—Harrison L. Hinson
*Attorney, Agent, or Firm*—Spencer & Kaye

[57] ABSTRACT

Apparatus for deflashing hollow bodies of plastic material including a series of gripping elements mounted on a support and moved along a path of transport to grip the necks of a succession of plastic bodies delivered to the apparatus by a conveyor, and to remove the bodies from the conveyor for further movement along the path to a position where the necks of the bodies are engaged by a cutting tool along a portion of the path of transport. Another movable element in the apparatus is positioned to engage the necks of the respective bodies as they approach the cutting tool and to impart a rotational movement to the neck of each body during the time the neck is engaged by the cutting tool.

16 Claims, 6 Drawing Figures

APPARATUS FOR DEFLASHING HOLLOW BODIES OF PLASTIC MATERIAL

BACKGROUND OF THE INVENTION

The present invention relates to an apparatus for deflashing hollow bodies, particularly bottles, of plastic material.

Hollow bodies of plastic material which are produced by blow molding generally have a flash attached to the top of their necks, and it is desirable to remove this flash.

Thus, for example in the case of hollow bodies produced by blow molding with the aid of a hollow needle which penetrates through a sealed parison in a mold, it is obviously necessary that the mark left by the needle should not appear in the completed hollow body. Therefore, when the hollow body is in the form of a bottle, provision is made for the parison to be perforated at a point situated beyond the portion constituting the neck of the bottle. After removal of the body from the mold there is obtained, in this case, a bottle, the neck of which is extended by a small portion of parison. This small portion, which may or may not be squeezed, is known as the false neck, and this portion contains the mark left by the blowing needle. This portion of parison must subsequently be removed in order to obtain a bottle ready for use.

In another technique, that is particularly useful for the production of bottles of small capacity, use is made of molds in which the cavity reproduces the shape of two bottles with their necks facing one another. In this case provision may also be made for effecting the blowing by means of a hollow needle which pierces the parison in a zone situated between the ends of the necks of the bottles to be blown. This zone must subsequently be removed by double deflashing, so as to form two bottles ready for use.

Finally, most of the blowing techniques in which forming is effected by driving a blowing nozzle into an open end of the parison result in hollow bodies in which the top part of the neck is uneven and requires deflashing.

The elimination of these waste portions situated above the useful portion of the necks of hollow bodies produced by the various methods indicated above can be effected manually, but because of the high rate of production of present molding machines this operation requires considerable, and consequently very expensive, labor.

Because of the costs involved in manual deflashing, the possibility of effecting the deflashing operation by mechanical means has been studied and various solutions have been proposed.

One proposed solution consists in equipping the mold with means enabling this cutting or deflashing operation to be effected during the molding. Nevertheless, this operation is often a very delicate one and entails an increase in the cost of the molds. Furthermore, the deflashing means of this nature are dependent on the molding technique and it is therefore impossible to provide a solution which can be universally applied.

A second proposed solution consists in providing an independent deflashing apparatus which treats the hollow bodies on leaving the molding machine. The appliances developed for this purpose frequently have drawbacks. Thus some of these appliances cannot provide a sufficiently high working rate to handle the hollow bodies with an output equal to that of the molding machines. Others are difficult to control, are liable to periodic breakdowns, or else are very expensive.

Applicants have also proposed an apparatus which is very simple to produce and which in numerous cases can give very satisfactory results. This apparatus comprises a driving device which is provided for the hollow bodies to be treated and which is constituted by a fixed guide and a movable guide, which grip the hollow bodies between them at neck level. The guides effect a transversal displacement of the bodies which simultaneously imparting to them a movement of rotation about their longitudinal axis. An adjustable cutting tool is disposed obliquely in relation to the trajectory described by the longitudinal axis of the hollow bodies and perpendicularly to said axis.

This apparatus, which is economical because of its simplicity, nevertheless has some disadvantages. Thus during the cutting away of the flash, the neck of the rotating hollow body rolls along the knife and it may happen that the hollow body being treated is wedged between the cutting device and the movable guide, thus upsetting the operation of the production line.

In addition, applicants have found that the speed of translation of the hollow body passing through the apparatus is not equal to the speed of displacement of the movable guide, and that the difference between these speeds is variable in dependence on the hollow bodies treated. The speed at which each successive hollow body passes through the deflashing apparatus is in fact dependent on the resistance to cutting which is offered by the neck of the body. Consequently, if the hollow bodies to be treated are introduced into the apparatus at regular intervals, they will not pass out of the apparatus at these same intervals. This may, in some cases, be detrimental to the good operation of the packing machines which receive the bodies from the apparatus.

Finally, applicants have found that with this type of deflasher apparatus it is not possible to obtain high output rates.

SUMMARY OF THE INVENTION

Therefore it is an object of the present invention to provide a deflashing apparatus which eliminates the disadvantages mentioned above.

Thus the apparatus, according to the invention, makes it possible to obtain very high production rates without risk of disrupting the normal operation of the apparatus. Among other things, the apparatus is so designed that no hollow body being handled can become jammed during the deflashing operation. In addition, the operation of the apparatus can be in perfect synchronization with the operation of other stations in a production line.

In general the apparatus for deflashing hollow bodies of plastic material, according to the invention, includes a first movable device which drives the hollow bodies in succession through the apparatus to and along a cutting means. This movable device is equipped with means for gripping the hollow bodies only at their neck and presenting them in the correct position for deflashing. In addition, there is a second movable device likewise acting at the level of the neck of the hollow bodies and imparting to these bodies an individual movement of rotation about their longitudinal axes when they are in contact with the cutting means or tool.

In this type of apparatus the speed of rotation of the hollow bodies at the time they are being deflashed is no longer dependent on their speed of displacement along the cutting means. Therefore it is possible to control this speed of rotation in order to obtain optimum deflashing work. That is to say, in such a manner as to avoid any undesirable wedging of the hollow bodies between the cutting means and the device driving the hollow bodies.

The driving device has the function of bringing each hollow body in succession into contact with the deflashing cutting tool. This driving device is equipped with means intended to receive the neck of the hollow body to be deflashed and is so designed as to permit the rotation of the hollow bodies about their longitudinal axis. Consequently, hollow bodies of any general shape can be treated.

The driving device does not operate simply by contact, but is equipped with means such as hooks, notches, etc., which force the hollow bodies through the deflashing apparatus even if they accidentally tend to be wedged between the cutting tool and the driving device.

In addition the speed of displacement of the driving device is preferably adjustable. Since the speed of displacement of the hollow bodies is absolutely equal to the speed of displacement of the driving device, perfect synchronization of the deflashing device with the other elements of the production line is ensured.

This driving device is also equipped with means effecting correct positioning of the necks of successive hollow bodies for the purpose of deflashing, such means are designed to cooperate with elements, such as circular grooves or ribs, molded on the rocks of the hollow bodies to be deflashed. In this manner the deflashing is always effected at the same level, on the necks, thus facilitating subsequent operations at the filling, stoppering stations, etc. The driving device may be a rotating plate, a chain, a belt, or any other means capable of passing the hollow bodies through the deflashing device.

In a preferred embodiment, the driving device is a rotating plate equipped with hooks, for retaining hollow bodies, which are fixed on its edge face. This driving device is also provided on its periphery with rollers turning freely about their axis. The peripheral faces of these rollers have a profile such that, by cooperating with elements provided on the hollow bodies to be treated, such as for example circular grooves or ribs, on the necks of the bodies, they effect correct positioning of the hollow bodies in relation to the cutting tool. In addition, these rollers are so disposed that each hollow body held by a hook will be in contact with two successive rollers.

The second movable device has the function of imparting to the hollow bodies an individual movement of rotation about their longitudinal axis. This second device generally operates by friction between a drive element and the neck of the hollow bodies.

This second device is situated upstream of the cutting tool so that the hollow bodies are preferably already rotating about their longitudinal axis as they approach the cutting tool. It may, for example, be an endless belt or a wheel, the edge face of which is covered with an elastic material, bearing against the neck of the hollow body at the moment when the latter approaches the cutting tool and during the passage of the body along the cutting tool.

This second device is preferably equipped with means permitting adjustment of its speed of displacement and of the pressure which it applies to the necks of the hollow bodies to be deflashed.

In addition this second device is so designed as to cooperate with the molded elements provided on the necks of the hollow bodies, such as circular grooves or ribs, and thus contribute towards the correct positioning of the hollow bodies at the moment when they are deflashed.

The cutting means or tool may be a straight fixed blade or a circular fixed blade, or else a cutting roller which may be fixed or free to turn about its axis.

In another embodiment of the invention the cutting blade is fixed and its leading corner is doubly bevelled. In this case the apex of this angle may be rounded in order to increase the wear resistance of the blade. This type of blade is obtained by bevelling the edge of the blade perpendicular to its cutting edge on the side where the hollow bodies to be deflashed are engaged. This bevelling may be effected over the entire length of this side or only on part of the latter.

If desired means may be provided for heating the cutting tool in order to facilitate its penetration into the plastic material to be cut. For example, this heating may be achieved by Joule effect or by heating the tool support block through a circulation of a heat carrier fluid.

The apparatus according to the invention may be designed for deflashing conventional single hollow bodies. In this case the elements effecting the driving and producing the rotation and also the cutting device are preferably disposed in horizontal planes and the hollow bodies are held in a vertical position during their deflashing.

The deflashing apparatus may also be designed for deflashing and separating assemblies comprising two hollow bodies joined by their necks. In this case the elements effecting the driving and producing the rotation and also the cutting tool are preferably disposed in vertical planes and the assemblies of hollow bodies are held in a horizontal position during their deflashing. In this particular case the cutting device is constituted, by two parallel blades spaced apart a distance equal to the length of the central portion between the necks which are to be removed. In this case it is also advantageous to provide two elements for rotating the hollow bodies, these elements being disposed one on each side of the cutting device.

In addition the apparatus according to the invention is equipped with known means, for bringing the hollow bodies to be treated to the driving element, for removing the hollow bodies when they leave the deflashing tool, and for removing the waste material.

The apparatus according to the invention is furthermore illustrated by the description which follows of two examples of practical embodiment. The first embodiment relates to an apparatus which is particularly suitable for separating sets of two hollow bodies with their necks connected together, while the second embodiment relates to an apparatus particularly suitable for deflashing the neck of conventional single hollow bodies.

DESCRIPTION OF THE PREFERRED EMBODIMENTS

Figure 1:
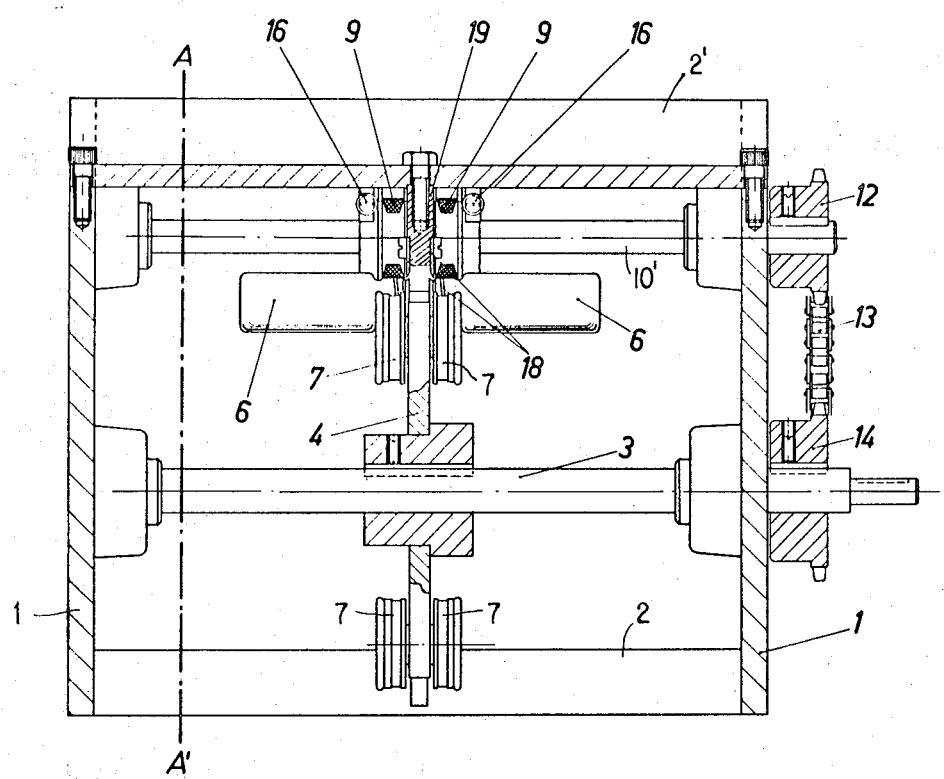
FIG. 1 is a side view partially in section, of a first embodiment of the invention.
Figure 2:
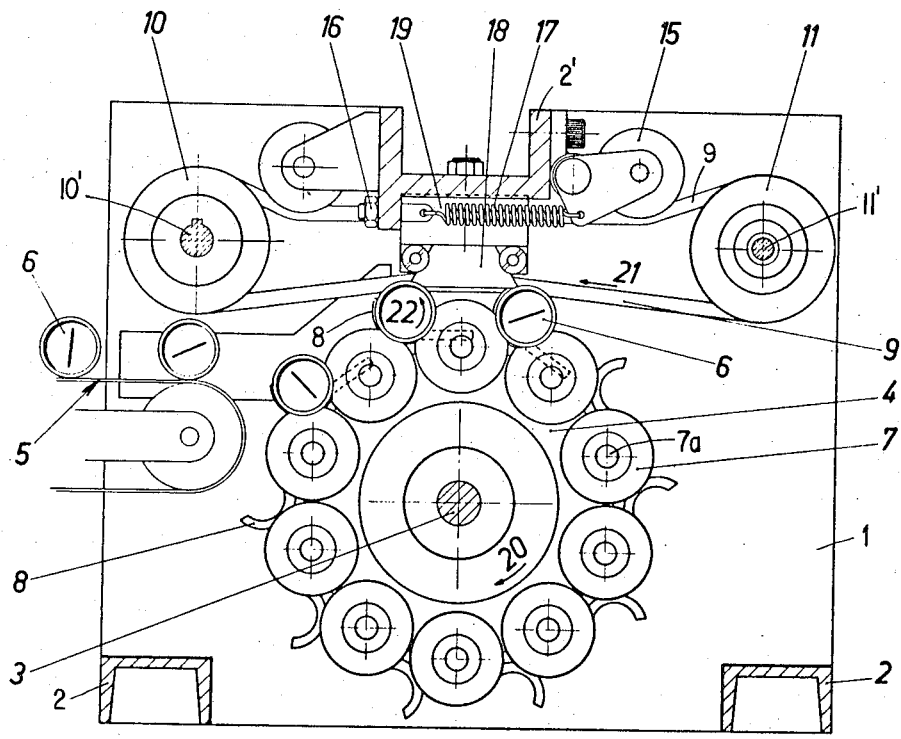
FIG. 2 is a cross-sectional, elevational view along the line AA of FIG. 1.

As shown in FIGS. 1 and 2 of the drawing, a first embodiment of the deflashing apparatus is composed of a frame composed of side plates 1 connected together by two channel irons 2 and a single channel iron 2'. Side plates 1 rotatably support a shaft 3, on which a driving element consisting of the circular plate 4 is fixed. With the aid of known drive means, not shown, this plate can be given a peripheral rotational speed synchronized with that of a conveyor, generally shown at 5. This synchronism can be achieved through a simple mechanical connection between the conveyor drive and the means for rotating shaft 3, or a variable speed motor driving the conveyor. This conveyor presents, in a recumbent position, the sets of hollow bodies 6 to be treated in the deflashing apparatus. The bodies are received on the conveyor 5 from a molding plant, not shown.

A plurality of rollers 7 are fixed on each side of the periphery of the plate 4 and serve at the same time as guide and rolling support elements for the neck of the hollow bodies 6. These rollers 7 are free to turn about their axis 7a. The number of rollers situated on the same side of the circular plate 4 is preferably an even number, so that by removing one roller out of each two it is possible to increase the distance between two successive axes of rotation of the hollow bodies, such as bottles. In this manner it is possible for bodies, the necks of which have various diameters, to be treated with the same apparatus, without substantial modification.

The diameter of the rollers 7 is preferably equal to 1.5 – 2.5 times the diameter of the necks of the hollow bodies to be deflashed, so as to insure sufficient rotational seating for the necks of the hollow bodies.

The profile of the peripheral face of the rollers 7 must be adapted to the type of neck of the hollow bodies to be treated, so as to cooperate with elements provided on these necks. For example, circular grooves or ribs can be provided for positioning the successive hollow bodies for the purpose of deflashing. Thus, for the treatment of hollow bodies, the neck of which is externally threaded, it is convenient for the peripheral face of the rollers 7 to have a recess opposite this screw thread. This, of course, helps to prevent the screw thread from influencing the position occupied by the hollow bodies.

The edge face of the circular plate 4 is equipped with a plurality of hooks 8, the shape of which matches that of the necks of the hollow bodies to be treated. These hooks 8 and the rollers 7 are disposed in such a manner on plate 4 that the neck of each hollow body engaged in a hook 8 rests on two pairs of consecutive rollers 7.

The apparatus also contains means for effecting the rotation of the necks of the hollow bodies 6 to be deflashed. This means includes two endless belts 9 extending between a drive pulley 10 and a return pulley 11 rotatably mounted between side plates 1 on shafts 10' and 11'. The drive pulley 10 may be driven rotationally by means of a toothed pinion 12 keyed on shaft 10' of the pulley with the aid of a transmission chain 13 and toothed pinion 14 keyed on the shaft 3 of the circular plate 4.

It is, however, obvious that the drive pulley 10 may be rotated by a source of energy independent of that driving the circular plate 4.

The drive pulley 10 and the return pulley 11 are so disposed that the belts 9 bear against the necks of the hollow bodies 6 during part of their displacement produced by the circular plate 4. The force by which these belts are applied against the necks of the hollow bodies may moreover be adjusted by means of tensioning pulleys 15 mounted on channel 2' and which are adjustable by means of screws 16 and tension springs 17.

Furthermore, these belts are so disposed as to bear against the necks of the hollow bodies 7 on each side of the position in which the flash is to be cut away. The profile and the arrangement of these belts may advantageously be so designed as to cooperate in the correct positioning of the necks of the hollow bodies to be deflashed.

The deflashing apparatus contains a cutting means constituted by two parallel blades 18 mounted on a support block 19 fixed detachably and adjustably on channel 2' of the frame. The distance between these blades and their positioning are obviously selected so as to effect the two cuts in the necks of the hollow bodies in the desired positions. These blades are preferably disposed slightly secant to the trajectory described by the necks of the hollow bodies 7 when they are driven by the circular plate 4.

The operation of the apparatus which has just been described is as follows. The hollow bodies 6, supplied to the deflashing apparatus by the conveyor 5 are successively gripped at their necks by the hooks 8 of the driving plate 4 rotating in the direction of the arrow 20, and are correctly positioned by the rollers 7.

At the moment when the necks of the hollow bodies approach the cutting means, the belts 9, moving in the direction of the arrow 21, bear against the necks and impart to them a rapid rotational movement in the direction of the arrow 22, shown on one of the bodies, while the blades 18 effect the desired cutting.

Because of the hooks 8 it is impossible for a hollow body 7 to become wedged between the driving plate 4 and the blades 18 during the cutting operation. In addition the speed of displacement of the hollow bodies 7 through the deflashing apparatus is kept constant and this permits perfect synchronization of the deflashing apparatus with the other elements of a production line which precede or follow it.

One of the advantages of the apparatus, according to the invention, consists in that the speed of the driving device 4 is so selected as to integrate the apparatus in the best possible way in the production line, and the speed of the means used to rotate the hollow bodies 7 is selected independently so as to provide optimum cutting conditions.

During tests carried out with sets of two hollow bodies made of polyvinyl chloride, with their necks connected together, the applicants were able, with the apparatus just described; to obtain deflashing rates higher than 20,000 cuts per hour.

As a comparative example, using previously known apparatus having a fixed guide and a movable guide and with the same sets of hollow bodies it was not possible to exceed a production rate higher than 6,000 cuts per hour without encountering serious operating difficulties.

Figure 3:
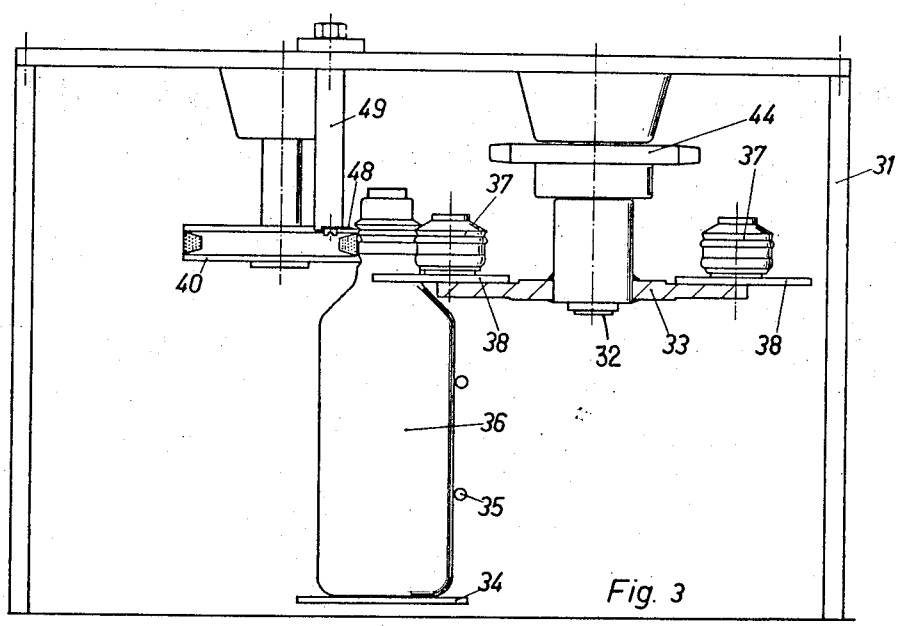
FIG. 3 is a view in elevation of a second embodiment of the invention.
Figure 4:
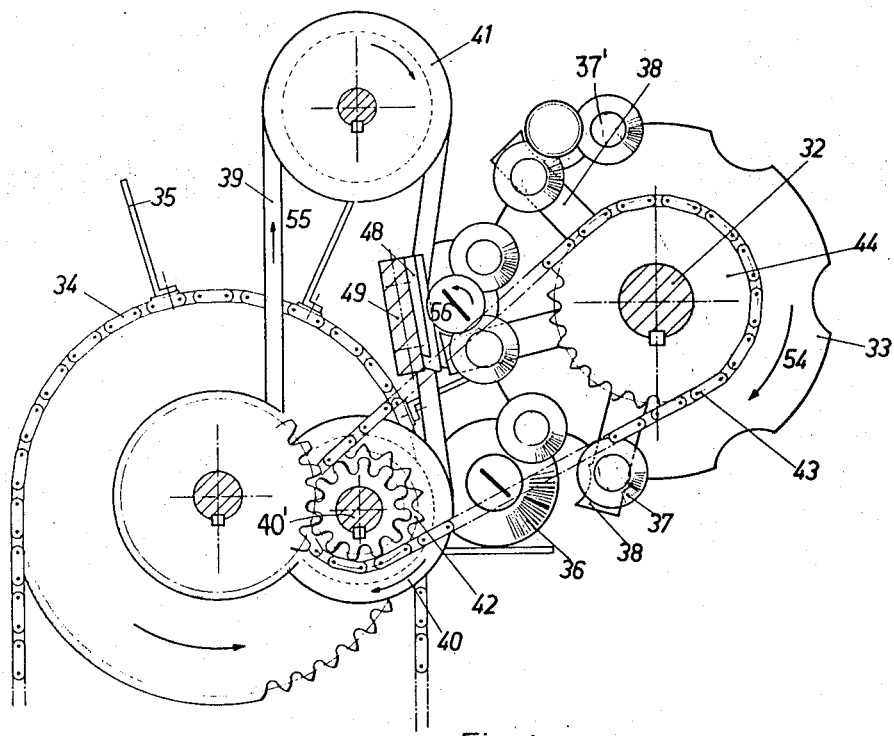
FIG. 4 is a plan view of the embodiment of the apparatus shown in FIG. 3.

A second embodiment of the invention is disclosed in FIGS. 3 and 4 and for the sake of clarity only the elements necessary for the good understanding of the composition and operation of the deflashing apparatus are shown. The deflashing apparatus is composed of a frame 31 supporting a rotating shaft 32 on which is fixed the drive element composed of the circular plate 33. This plate can be given a peripheral rotational speed synchronized with that of a conveyor element 34 provided with blades 35, in a known manner as in the first embodiment of the invention. The conveyor presents the individual hollow bodies 36 to be treated, to the apparatus in a vertical position. As in the first embodiment these bodies are received on the conveyor from a molding plant, not shown.

Rollers 37, which are free to turn about their axis 37', are fixed on the periphery of the plate 33. These rollers serve as guide and rolling support elements for the necks of the hollow bodies 36 to be deflashed. The diameter of the rollers must be sufficient to effect satisfactory rotational seating for the necks of the hollow bodies. In addition the profile of the peripheral face of the rollers 37 must be adapted to the type of neck of the hollow bodies to be treated, so as to cooperate with elements provided on said necks, such as for example circular grooves or ribs, for correctly positioning the successive hollow bodies. Thus for the treatment of hollow bodies, the necks of which are threaded externally, it is convenient for the peripheral faces of the rollers 37 to have a recess opposite this thread, in order that the latter cannot influence the position occupied by the hollow bodies.

The periphery of the circular plate 33 is also equipped with a plurality of hooks 38 and the shape of these hooks is adapted to that of the necks of the hollow bodies to be treated. The hooks 38 and the rollers 37 are disposed in such a manner that the neck of each hollow body engaged in a hook rests on a pair of adjacent rollers.

The apparatus also contains means for effecting the rotation of the necks of the individual hollow bodies 36 to be deflashed. This means includes an endless belt 39 extending between a drive pulley 40 and a return pulley 41. As seen in FIG. 4 the drive pulley 40 may be driven rotationally from the shaft of the circular plate 33 with the aid of the toothed pinion 42 keyed on its shaft 40', a transmission chain 43, and a toothed pinion 44 keyed on the shaft 32 of the circular plate. However, it should be obvious that the drive pulley 40 could be rotated by a source of energy independent of that driving the circular plate 33.

The drive pulley 40 and the return pulley 41 are so disposed in frame 31 that the belt 39 bears against the necks of the hollow bodies during part of their displacement caused by the circular plate 33.

Known adjustment means, not shown, may be provided to permit regulation of the force by which the belt 39 bears against the necks of the hollow bodies 36. Furthermore, this belt is so disposed as to bear against the necks of the hollow bodies as close as possible to the position where the deflashing cut is to be made. Finally, the profile and arrangement of the belt may advantageously be so designed as to cooperate in the correct positioning of the necks of the hollow bodies to be deflashed.

Figure 5:
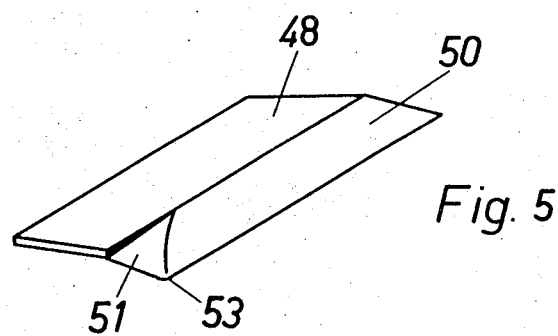
FIGS. 5 and 6 are perspective views of blades with which the apparatus shown in FIGS. 3 and 4 is equipped.

The apparatus is provided with a cutting means composed of a straight fixed blade 48, which is mounted on a support block 49 fixed detachably and adjustably on the frame 31. This fixed blade may have the profile illustrated in FIGS. 5 and 6. As can be seen from these Figures, the blade 48 has a bevelled cutting edge 50 and in addition is partially bevelled at 51, or completely bevelled at 52, along the edge perpendicular to the cutting edge 50, on that side of the blade where the hollow bodies to be deflashed are initially engaged.

Figure 6:
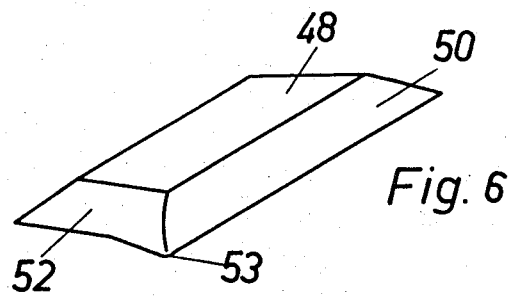

The leading corner 53 of these blades 48 is preferably rounded so as to increase resistance to wear. Finally, the bevels of the blade may be made in such a manner as to obtain a leading cutting corner 53 projecting beyond the cutting edge 50 of the blade, as shown in FIG. 6.

The blade 48 is positioned in the deflashing apparatus so as to be slightly secant to the trajectory described by the necks of the hollow bodies when they are driven by the circular plate 3, and in such a manner that the cutting of the flash to be removed is started at the tip 53 of the blade.

The operation of the second embodiment of the apparatus just described is as follows.

The individual hollow bodies 36 supplied by the conveyor device 34 are successively gripped by their necks by the hooks 38 of the circular plate 33 rotating in the direction of the arrow 54, and are correctly positioned by the rollers 37. At the moment when the necks of each body approaches the cutting blade 48, the belt 39, moving in the direction of the arrow 55, bears against the necks and imparts to them a rapid movement of rotation in the direction of the arrow 56 while the blade 48 cuts off the flash. This cutting is started by the penetration of the tip 53 of the blade 48 into the neck of the hollow body 36 at the point where it is desired to make the cut. Because of the hook 38 it is impossible for a hollow body to be wedged between the drive plate 33 and the blade 48 during the cutting operation. Moreover, the speed of displacement of the hollow bodies through the deflashing apparatus is kept constant, thus permitting synchronization with the other devices of a production line which precede or follow the deflashing apparatus.

By using blades, the leading tip of which is doubly bevelled, the applicants have found that better cutting quality is obtained. Moreover, it is possible to work at higher rates and to work on hotter hollow bodies without risking deformation at the point where the cut is made. Finally it is possible to work with shorter blades, which have the advantage of being more rigid.

It will be understood that the above description of the present invention is susceptible to various modifications, changes, and adaptations, and the same are intended to be comprehended within the meaning and range of equivalents of the appended claims.

We claim:

1. Apparatus for successively removing plastic hollow bodies having a neck from a conveyor and deflashing the neck of such bodies, comprising, in combination:

a. a movable support and a series of gripping elements arranged on said support for movement therewith along a path of transport going past a withdrawal point where each respective gripping element is in a position to grip externally the neck of a plastic body having a flash attached to its neck, to remove the body from the conveyor;

b. fixed cutting means disposed for engaging the neck of the body along a portion of the path of transport beyond the withdrawal point; and c. movable means arranged for engaging externally the neck of the body as it is carried along the path of transport by its respective gripping element and approaches said cutting means, said movable means imparting to the body an independent movement of rotation about its longitudinal axis as the neck passes along said cutting means and in engagement therewith for cutting off the flash, said movable means being arranged for imparting to the body said movement of rotation independently from the movement along said path of transport imparted to said body by said support and said respective gripping element; and said support and said respective gripping element being arranged for imparting to the body said movement along said path of transport independently from said movement of rotation imparted to said body by said movable means.

2. Apparatus as defined in claim 1, wherein said gripping elements have surface profiles to mate with corresponding profile surfaces on the neck of the body.

3. Apparatus as defined in claim 1, wherein each respective gripping element includes hook means.

4. Apparatus as defined in claim 1, wherein said movable support is a circular plate member.

5. Apparatus as defined in claim 4, wherein said gripping elements include associated hook and roller means peripherally mounted on said circular plate member.

6. Apparatus as defined in claim 1, wherein said movable support is a chain member.

7. Apparatus as defined in claim 1, wherein said movable support is a belt member.

8. Apparatus as defined in claim 1, wherein said movable means is a belt.

9. Apparatus as defined in claim 1, wherein said movable means is a wheel with elastic material on the periphery thereof.

10. Apparatus as defined in claim 1, wherein said movable means includes means for adjusting its speed.

11. Apparatus as defined in claim 1, wherein said movable means includes means for adjusting the pressure with which it engages the neck of the body.

12. Apparatus as defined in claim 1, wherein said cutting means includes a straight blade that has a doubly bevelled leading corner directed toward the approaching bodies.

13. Apparatus as defined in claim 12, wherein the apex of the leading corner of the blade is rounded.

14. Apparatus as defined in claim 1, wherein said cutting means is fixedly mounted and is a circular blade.

15. Apparatus as defined in claim 1, wherein said cutting means is a circular blade which is mounted for rotation.

16. Apparatus as defined in claim 1, wherein said cutting means is associated with heating means.

* * * * *